(12) United States Patent
Bruhn

(10) Patent No.: US 11,987,411 B2
(45) Date of Patent: May 21, 2024

(54) METHOD FOR PACKING OBJECTS AND PACKAGING SYSTEM

(71) Applicant: Tentoma A/S, Broager (DK)

(72) Inventor: Frank Bruhn, Broager (DK)

(73) Assignee: Tentoma A/S, Broager (DK)

( * ) Notice: Subject to any disclaimer, the term of this patent is extended or adjusted under 35 U.S.C. 154(b) by 207 days.

(21) Appl. No.: 17/610,496

(22) PCT Filed: May 13, 2020

(86) PCT No.: PCT/IB2020/054522
§ 371 (c)(1),
(2) Date: Nov. 11, 2021

(87) PCT Pub. No.: WO2020/230046
PCT Pub. Date: Nov. 19, 2020

(65) Prior Publication Data
US 2022/0234771 A1    Jul. 28, 2022

(30) Foreign Application Priority Data

May 14, 2019    (DK) .............................. PA201900580

(51) Int. Cl.
*B65B 9/18*        (2006.01)
*B65B 35/24*      (2006.01)
(Continued)

(52) U.S. Cl.
CPC ................ *B65B 35/24* (2013.01); *B65B 9/18* (2013.01); *B65B 59/001* (2019.05);
(Continued)

(58) Field of Classification Search
None
See application file for complete search history.

(56) References Cited

U.S. PATENT DOCUMENTS 5,024,042 A    6/1991    Meyer

FOREIGN PATENT DOCUMENTS

| DK | 178374 B1 | 1/2016 |
| EP | 0532947 A1 | 3/1993 |
| WO | 2004/074105 A1 | 9/2004 |

OTHER PUBLICATIONS

PCT International Search Report for PCT Application No. P:CT/IB2020/054522 dated Aug. 7, 2020 (3 pages).
(Continued)

*Primary Examiner* — Praachi M Pathak
(74) *Attorney, Agent, or Firm* — Merchant & Gould P.C.

(57) ABSTRACT

A method, a packaging system, and use for packaging objects on a conveyor using a hose-shaped stretch foil of plastic material. A method, system, and use, where the hose-shaped stretch foil may be stretched around the objects in a horizontal manner. The packaging system comprises a first conveyor and a second conveyor where first and second conveyors are arranged for conveying objects from said first conveyor to said second conveyor. The system comprises a foil dispensing mechanism arranged in a space between the first and the second conveyor, and being arranged for dispensing a continuous hose-shaped foil onto said conveyed objects. The method comprises the steps of: conveying a first object and a second object via the first conveyor in a first conveying direction towards said second conveyor; conveying the first object through the foil dispensing mechanism, hereby arranging the hose-shaped foil onto the first object; conveying the first object from the first conveyor to the second conveyor; and conveying the second object in a direction opposite the first conveying direction by a predefined distance, hereby arranging an equal distance between said first object and said second object in said space between said first conveyor and said second conveyor.

9 Claims, 2 Drawing Sheets

(51) Int. Cl.
 *B65B 39/00* (2006.01)
 *B65B 59/00* (2006.01)
 *B65B 59/02* (2006.01)
 *B65B 61/06* (2006.01)
 *B65G 15/14* (2006.01)
 *B65G 47/30* (2006.01)

(52) U.S. Cl.
 CPC ............ *B65B 59/005* (2013.01); *B65B 59/02* (2013.01); *B65B 61/06* (2013.01); *B65G 15/14* (2013.01); *B65G 47/30* (2013.01); *B65G 2203/0283* (2013.01)

(56) References Cited

OTHER PUBLICATIONS

PCT Written Opinion for PCT Application No. P:CT/IB2020/054522 dated Aug. 7, 2020 (6 pages).

METHOD FOR PACKING OBJECTS AND PACKAGING SYSTEM

This application is a National Stage Application of PCT/IB2020/054522, filed 13 May 2020, which claims benefit of Serial No. PA201900580, filed 14 May 2019, in Denmark and which applications are incorporated herein by reference. To the extent appropriate, a claim of priority is made to each of the above disclosed applications.

TECHNICAL FIELD

The present invention relates to a method, a packaging system, and use for packaging objects on a conveyor using a hose-shaped stretch foil of plastic material. More specifically, the invention provides a method, system and use, where the hose-shaped stretch foil may be stretched around the objects in a horizontal manner.

BACKGROUND OF THE INVENTION

The technique of packing an article via stretch packaging aims to give protection to a stack of goods during transport, against humidity and other environmental influences. Hereby stretching with a hose-shaped stretch foil ensures good stability to the packed goods. Further, the stretch foil applied to the goods is suitable for manufacture logos, information of the goods, etc. and the stretch foil is preferable premanufactured with the desired graphic information.

Prior art systems are generally used for the purposes of packing up a product, which is arranged for the most part on a pallet, at least in part with a tubular film in a packaging machine. This serves to stabilize the product and to provide protection against the surroundings. The tubular film may be configured as a hood that is closed at the top, or as a band that is open at the top and the bottom. These systems utilize a tubular film portion matching the size of the product, and the systems basically unroll a portion of the film onto gathering fingers which are fastened to a frame. A gathering drive unit is then moved into contact with the tubular film portion such that an operative connection is created. By driving the gathering roller, the tubular film portion is gathered-up onto the individual gathering fingers such that a film store laid in folds is formed on the respective gathering finger. Once the tubular film portion has been gathered-up, the gathering fingers are driven in a substantially horizontal manner such that the tubular film portion is expanded or stretched. Expanding or stretching refers to a state where an elastic or elastic-plastic deforming of the tubular film occurs. The gathering fingers are then driven in a vertical manner along the product. At the same time the tubular film is released from the gathering fingers and the product is packed therein as a result of the elastic resiliency of the tubular film portion.

An example of prior art systems is disclosed in U.S. Pat. No. 5,024,042.

An example of another prior art system is disclosed in the applicant's own Danish patent no. 178374 B1. Herein is disclosed a system that differs from the systems described above in that packing is achieved horizontally instead of vertically.

Particularly, the Danish reference discloses a system for packaging objects with a hose-shaped stretch foil, where the system comprises a movable packaging frame having a foil dispensing mechanism with a plurality of horizontally oriented gripping arms for holding and stretching the stretch foil. The system comprises a first conveyor for supporting the object and transporting it towards the packaging frame so that the object is delivered between the gripping arms and a second conveyor for supporting the object and transporting it away from the packaging frame with the foil dispensing mechanism. The system further comprises a second conveyor for supporting the object and transporting it away from the packaging frame.

The system even further comprises a cutting device for cutting a predetermined portion of hose-shaped stretch foil when an object is packed with the foil. The cutting is preferably achieved by heating the open end in conjunction with an occlusion of the stretch foil.

The packing frame including the foil dispensing mechanism, which dispenses the hose-shaped stretch foil onto the products, is arranged in a space between the first conveyor and the second conveyor. Typically, this space is not equipped with conveying means for moving the objects from the first conveyor to the second conveyor. When packing longer articles with stretch foil, the article may span the entire space between the two conveyors in a sufficient manner for allowing the second conveyor to drag the article away from the first conveyor. However, when smaller or shorter articles are to be packed with stretch foil, especially when the dimension of the article in the conveying direction is smaller than the space between the two conveyors or only a short distance longer, there exists a need for urging the article through the packaging frame and onto the second conveyor. This urging of the smaller articles is completed by a separate pushing mechanism called a "pusher".

Typically, the "pusher" is a fully automated mechanical arm that is connected to the controller of the packaging system, such that when an object is transported on the first conveyor towards the packaging frame, the "pusher" pushes the object through the packaging frame and onto the second conveyor for transport away from the packaging frame and the first conveyor.

However, the process of the "pusher" moving the objects from the first conveyor through the packaging frame and onto the second conveyor is time consuming. Especially when the conveyed objects is a large number of objects that has to be conveyed through the packaging frame at a relatively high conveying speed in order to save packaging time. Further, the "pusher" is a complex mechanical mechanism, which has to me maintained and therefore is cost consuming.

It is an object of the present invention to provide a method and a packaging system that is suitable for packaging objects on a conveyor using a hose-shaped stretch foil in a horizontal packaging direction, in which the objects to be packed may be conveyed at a relatively high conveying speed in a simple and cost effective manner.

The above object and advantages, together with numerous other objects and advantages, which will be evident from the description of the present invention, are according to a first aspect of the present invention obtained by:

A method for packing objects in a hose-shaped foil in a packaging system, the packaging system comprising a first conveyor having a first conveying direction, and a second conveyor having a second conveying direction, the first and second conveyor being arranged for conveying objects from the first conveyor to the second conveyor, the packaging system further comprising a foil dispensing mechanism arranged in a space between the first conveyor and the second conveyor, and arranged for dispensing a continuous hose-shaped foil onto the conveyed objects, the method comprising the following steps:

conveying a first object and a second object via the first conveyor in a first conveying direction towards the second conveyor;

conveying the first object through the foil dispensing mechanism, hereby arranging the hose-shaped foil onto the first object;

conveying the first object from the first conveyor to the second conveyor when the first object is disengaged from the first conveyor by the second object pushing the first object in relation to the foil dispensing mechanism, and conveying the second object in a direction opposite the first conveying direction by a predefined distance, hereby arranging an distance between the first object and the second object in the space between the first conveyor and the second conveyor.

Hereby is defined a method for packing objects with a hose-shaped stretch foil, which may be accomplished at a relative high speed. In the method according to the invention, the need for a "pusher" that moves a first object from the first conveyor, through the foil dispensing mechanism, and onto the second conveyor is avoided due to the innovative movement of the a second following object. The second object takes over the function of the "pusher" by a first movement in the conveying direction, where the second object pushes the first object from the first conveyor onto the second conveyor. In an intermediate space between the two conveyors, the foil dispensing mechanism is arranged, and therefore there is no intermediate conveying mechanism. Preferably, there is arranged a supporting mechanism, such as a plate or rollers, for guiding the objects through the foil dispensing mechanism and closing the gab between the first and second conveyor. After the first object is pushed onto the second conveyor, the first conveyor reverses the conveying direction and conveys the second object in the opposite direction and away from the first object by a predetermined distance, which in a preferred embodiment is such that the second object does not interfere with a foil cutting and sealing mechanism which may be arranged in connection with the foil dispensing mechanism.

According to a further embodiment of the first aspect of the invention, the method further comprises: cutting the continuous hose-shaped foil between the first and the second object with a foil cutting and sealing mechanism, arranging a first hose-shaped foil part on the first object and a remaining hose-shaped foil part on the foil dispensing mechanism.

After the first object is pushed onto the second conveyor by the second object, and the second object is conveyor in the opposite direction by a predefined distance, a cutting mechanism cuts the hose-shaped foil between the first and second object, hereby arranging a stretch foil part on the first object, and the remaining foil on the foil dispensing mechanism ready to be stretched around the next object, which is now the second object that is pushed by a third object.

According to a further embodiment of the first aspect of the invention, the first conveyor comprises a first lower conveyor, and a first upper conveyor, and where prior to the conveying, a distance between the first lower conveyor and the first upper conveyor is adjusted corresponding to a vertical dimension of the conveyed object, either automatically or manually.

In a preferred embodiment, the first conveyor comprises a first lower conveyor and a first upper conveyor. Hereby, the conveyed objects are arranged between the lower and upper conveyors, conveying with the same speed. This is especially advantageous in a situation where the objects are conveyed at a relatively high speed, when a large number of objects is to be packed or when the objects to be packed are stacked. Hereby, the objects is conveyor in a controlled manner avoiding any slippage or misalignment between the conveyor or stacked objects. Further, the distance between the lower and upper conveyor may be adjusted according to the height of the conveyor objects. In a basic embodiment however, the first and second conveyors comprises only the lower conveyor.

According to a further embodiment of the first aspect of the invention, the second conveyor comprises a second lower conveyor, and a second upper conveyor, and where prior to the conveying, a distance between the second lower conveyor and the second upper conveyor is adjusted corresponding to a vertical dimension of the conveyed object, either automatically or manually.

According to a further embodiment of the first aspect of the invention, where, during the cutting, the foil cutting and sealing mechanism heats, melts and seals an end of the first hose-shaped foil part and a first end of the remaining hose-shaped foil part.

The cutting mechanism preferably cuts the hose-shaped foil by the use of heat which heats and melts the foil and at the same time seals the end of the foil part. Hereby, the packed object is entirely packed and resistant to e.g. humidity or other environmental influences. The foil cutting and sealing mechanism both cuts the hose shaped stretch foil, and seals the first object with a back seal and at the same time arranges an front seat on the remaining stretch foil to be arranged onto the second and following object.

According to a further embodiment of the first aspect of the invention, where prior to the cutting, said the object is conveyed in the second direction by a predetermined distance, hereby dispensing an amount of hose-shaped stretch foil from the foil dispensing mechanism, whereafter the first object is conveyed opposite the second direction towards the foil cutting and sealing mechanism such that the part of the hose shaped foil to be cut and sealed is loose.

When the first object is conveyor through the foil dispensing mechanism, the foil is wrapped around the object and is continued to be dispensed from the foil dispensing mechanism when the first object is conveyed in by the second conveyor. Here, the part of the hose shaped stretch foil, which at this point has not been cut, is stretched between the first object and the foil dispensing mechanism such that the cutting and sealing mechanism has difficulty in cutting and sealing due to the limited amount of hose shaped stretch foil. By conveying the first object further in the second direction, a small amount of stretch foil is pulled from the dispensing mechanism, and as the first object is conveyed backwards again, the part of the hose shaped stretch foil between the first object and the foil dispensing mechanism becomes loose, whereby the foil cutting and sealing mechanism can easily cut and seal the stretch foil.

According to a second aspect of the present invention, the above objects and advantages are obtained by:

A packaging system for performing the above mentioned method and where the system comprises a first conveyor having a first conveying direction, and a second conveyor having a second conveying direction, the first and second conveyors are arranged for conveying objects from the first conveyor to the second conveyor, the packaging system further comprising a foil dispensing mechanism and a foil cutting and sealing mechanism arranged in a space between the first conveyor and the second conveyor, the dispensing mechanism being arranged for dispensing a continuous hose-shaped foil onto the conveyed objects, the first conveyor comprising a first lower conveyor and first upper conveyor, the first lower and the first upper conveyors being vertically adjustable in relation to each other.

According to a further embodiment of the second aspect of the invention, the second conveyor comprises a second lower conveyor and a second upper conveyor, the second and lower and second upper conveyors being vertically adjustable in relation to each other.

According to a further embodiment of the second aspect of the invention, the foil cutting and sealing mechanism is horizontally adjustable.

Arranging the system with a foil cutting and sealing mechanism that is horizontally adjustable has the advantage that the packing of each object may be customized, such that a snug packing is achieved each time.

According to a third aspect of the present invention, the above objects and advantages are obtained by:

Use of a packaging system for a method as defined above.

FIG. 1-9 show individual steps in the procedural method of the invention.

The present invention wilt now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will thus not be described in detail with respect to the description of each figure.

FIG. 1-3 show a first number of steps according to the method.

The figures illustrate a first object 24, a second object 26, and a third object 28 being conveyor on a first conveyor comprising a first lower conveyor 12 and a first upper conveyor 14. The objects 24, 26, 28 are conveyors in a first conveying direction indicated by the arrow, and being a direction towards and through a foil dispensing mechanism 34 having a hose-shaped stretch foil 20 arranged thereon. The objects 24, 26, 28 are further conveyed in a direction towards a second conveyor having a second lower conveyor 16 and a second upper conveyor 18 having a conveying direction equal to the first conveying direction of the first conveyor 12, 14. The free end of the hose-shaped stretch foil 20 comprises a seal 30, which engages the first conveyor object 24 such that the hose-shaped stretch foil is dispensed from the dispensing mechanism as the first object is conveyed there through, which is especially apparent from FIG. 3.

FIG. 4 illustrates a step in the method where the first object 24 is no longer in contact with the first conveyor 12, 14 and pushed in engagement with the second conveyor 16, 18 by the second object 26, which is still conveyed by the first conveyor 12, 14. The hose-shaped stretch foil preferably at this point encompasses approx. the half of the first object 24.

FIG. 5 illustrates the first object being conveyed a predetermined distance by the second conveyor 26, 18, and the second and third objects 26, 28 being conveyed in an opposite direction, away from the second conveyor 26, 18 by a predefined distance. Hereby, there is established a gap between the almost entirely packed first object 24 and the second object 26, which is still arranged on the first conveyor 12, 14.

FIG. 6-8 illustrate steps in the method where the first conveyor 12, 14 and the second conveyor 16, 18 are in a non-conveying mode. Hereby is it possible to cut the hose-shaped stretch foil between the first object 24 and the second object 26. The cutting of the stretch foil is accomplished by the foil cutting and sealing mechanism 22 being moved vertically and optionally horizontally into engagement with the foil 20 and melting the foil 20 such that it is cut and sealed. Hereby, the first object 24 is entirely sealed from the environment. The foil cutting and sealing mechanism both cuts the stretch foil and arranges a back seal onto the foil of the first object, and a front seal 36 onto the foil of the second and following object, as shown in FIG. 8.

Figure 1:
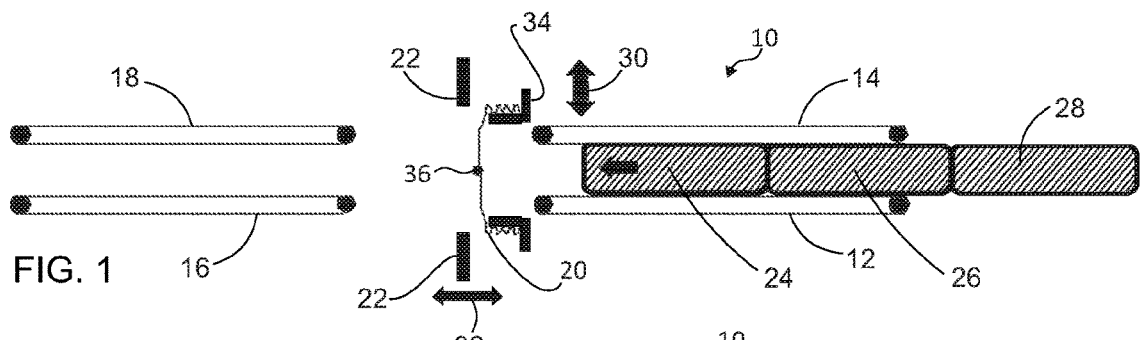
Figure 2:
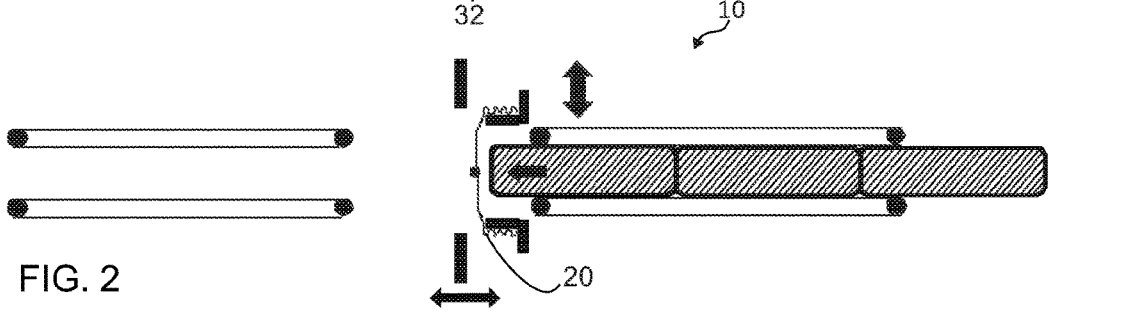
Figure 3:
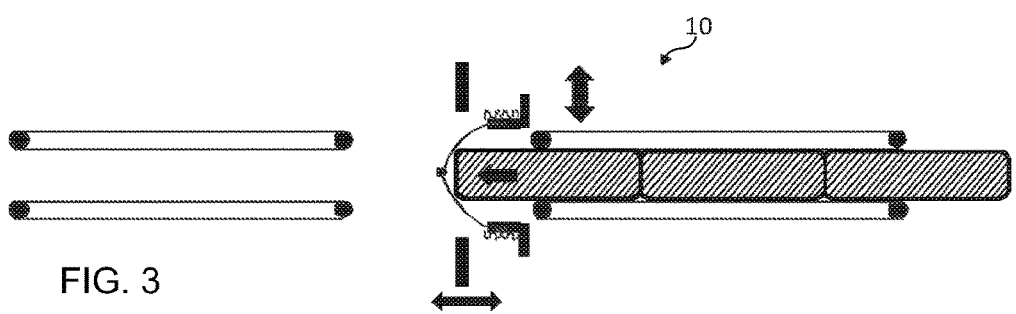
Figure 4:
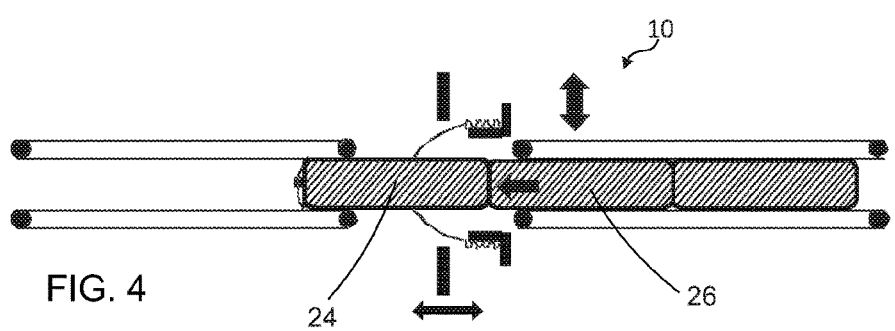
Figure 5:
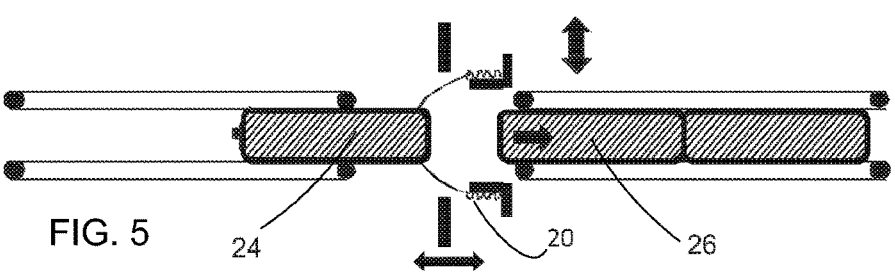
Figure 6:
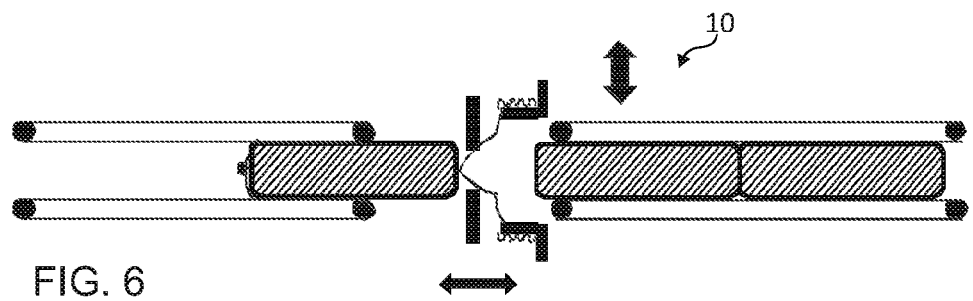
Figure 7:
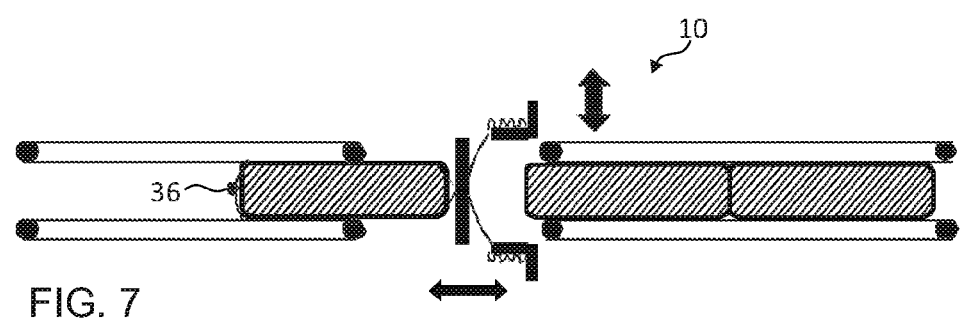
Figure 8:
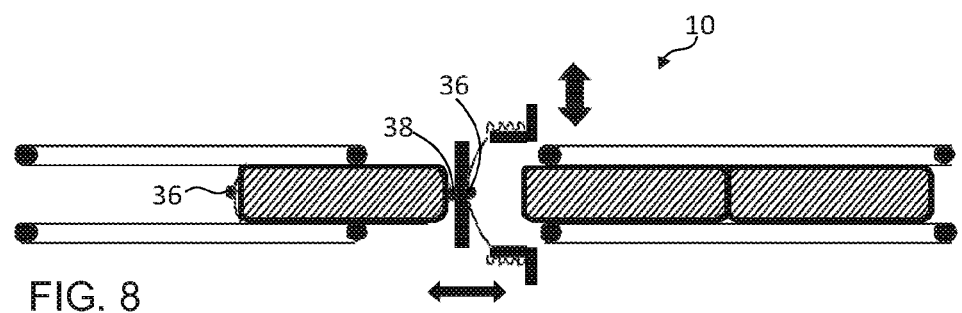
Figure 9:
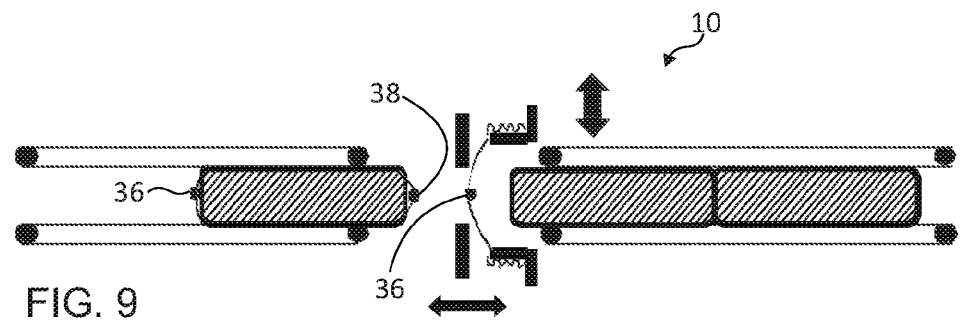
FIG. 9 illustrates a first object 24 being entirely packed and conveyed by the second conveyor 26, 18 in the first conveying direction, ready for storage.
Figure 10:
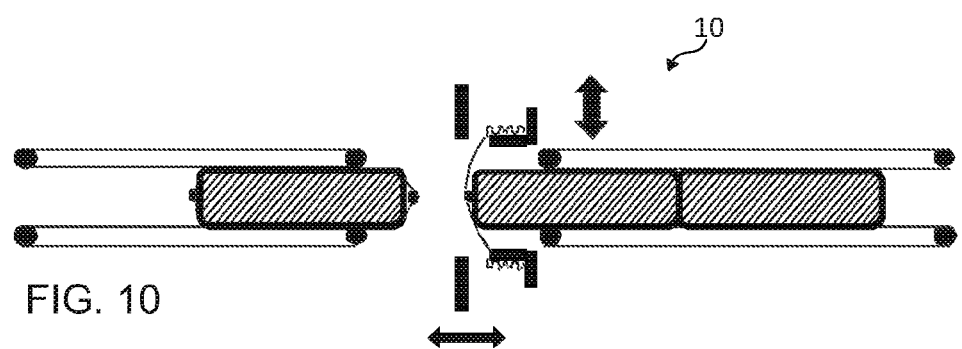
FIG. 10 illustrates the next step in the method where the second object 26 is to be packed according to the illustration of FIG. 2.

In the following is given a list of reference signs that are used in the detailed description of the invention and the drawings referred to in the detailed description of the invention.

10 Packaging system
    12 First lower conveyor
    14 First upper conveyor
    16 Second lower conveyor
    18 Second upper conveyor
    20 Hose-shaped stretch foil
    22 Foil cutting and sealing mechanism
    24 First object
    26 Second object
    28 Third object
    30 Upper conveyor adjustment direction
    32 Foil cutting and sealing mechanism adjustment direction
    34 Foil dispensing mechanism
    36 Front seal
    38 Back seal

The invention claimed is:

1. A method for packing objects in a hose-shaped foil in a packaging system, said packaging system comprising a first conveyor having a first conveying direction, and a second conveyor having a second conveying direction, said first and second conveyors being arranged for conveying objects from said first conveyor to said second conveyor, said packaging system further comprising a foil dispensing mechanism arranged in a space between said first conveyor and said second conveyor, and arranged for dispensing a continuous hose-shaped foil onto said conveyed objects, characterized in that said method comprising the following steps:

conveying a first object and a second object via said first conveyor in a first conveying direction towards said second conveyor, conveying said first object through said foil dispensing mechanism, hereby arranging said hose-shaped foil onto said first object, conveying said first object from said first conveyor to said second conveyor when said first object is disengaged from said first conveyor, by said second object pushing said first object in relation to said foil dispensing mechanism, and conveying said second object in a direction opposite said first conveying direction by a predefined distance, hereby arranging a distance between said first object and said second object in said space between said first conveyor and said second conveyor.

2. The method according to claim 1, wherein said method further comprises: cutting said continuous hose-shaped foil between said first and said second objects with a foil cutting and sealing mechanism, arranging a first hose-shaped foil part on said first object and a remaining hose-shaped foil part on said foil dispensing mechanism.

3. The method according to claim 2, wherein during said cutting, said foil cutting and sealing mechanism heats, melts and seals an end of said first hose-shaped foil part and a first end of said remaining hose-shaped foil part.

4. The method according to claim 2, wherein prior to said cutting, said first object is conveyed in said second direction by a predetermined distance, hereby dispensing an amount of hose-shaped stretch foil from said foil dispensing mechanism, whereafter said first object is conveyed opposite said second direction towards said foil cutting and sealing mechanism such that the part of the hose shaped foil to be cut and sealed is loose.

5. The method according to claim 1, wherein said first conveyor comprises a first lower conveyor, and a first upper conveyor, and where prior to said conveying, a distance between said first lower conveyor and said first upper conveyor is adjusted corresponding to a vertical dimension of said conveyed object, either automatically or manually.

6. The method according to claim 1, wherein said second conveyor comprises a second lower conveyor, and a second upper conveyor, and where prior to said conveying, a distance between said second lower conveyor and said second upper conveyor is adjusted corresponding to a vertical dimension of said conveyed object, either automatically or manually.

7. A packaging system for performing the method according to claim 1, wherein said system comprising a first conveyor having a first conveying direction, and a second conveyor having a second conveying direction, said first and second conveyors being arranged for conveying objects from said first conveyor to said second conveyor, said packaging system further comprising a foil dispensing mechanism and a foil cutting and sealing mechanism arranged in a space between said first conveyor and said second conveyor, said dispensing mechanism being arranged for dispensing a continuous hose-shaped foil onto said conveyed objects, said first conveyor comprising a first lower conveyor and first upper conveyor, said first lower and said first upper conveyors being vertically adjustable in relation to each other.

8. The packaging system according to claim 7, wherein said second conveyor comprises a second lower conveyor and a second upper conveyor, said second lower and second upper conveyors being vertically adjustable in relation to each other.

9. The packaging system according to claim 7, wherein said foil cutting and sealing mechanism is horizontally adjustable.

* * * * *